United States Patent [19]

Collins

[11] 4,133,075

[45] Jan. 9, 1979

[54] MEAT TENDERIZING APPARATUS

[75] Inventor: Paul D. Collins, Haverhill, England

[73] Assignee: Haverhill Meat Products Limited, Suffolk, England

[21] Appl. No.: 822,758

[22] Filed: Aug. 8, 1977

[30] Foreign Application Priority Data

Aug. 11, 1976 [GB] United Kingdom ............... 33433/76

[51] Int. Cl.² ................................................ A22C 9/00
[52] U.S. Cl. .......................................... 17/26; 17/27
[58] Field of Search ....................................... 17/26, 27

[56] References Cited

U.S. PATENT DOCUMENTS

| 1,600,002 | 9/1926 | Kingery | 17/26 |
| 1,635,053 | 7/1927 | Myers | 17/26 |
| 2,126,554 | 8/1938 | Hoy et al. | 17/26 |
| 2,564,651 | 8/1951 | Spang | 17/27 |
| 3,149,554 | 9/1964 | Greenspan | 17/26 |

Primary Examiner—Donald R. Schran
Attorney, Agent, or Firm—Sughrue, Rothwell, Mion, Zinn and Macpeak

[57] ABSTRACT

An apparatus for tenderizing meat by subjecting the meat fibres to compressive and impact forces, comprising a pair of driven rollers mounted in a frame, between which the meat is fed by a conveyor. The rollers are provided with elongate axial ribs, preferably of circular section, which alternate in the roller nip during rotation, and the rollers and the ribs are dimensioned such that the meat fibres are weakened without the meat becoming bruised. The invention is particularly applicable to the pre-treatment of ham immediately prior to brine injection.

9 Claims, 2 Drawing Figures

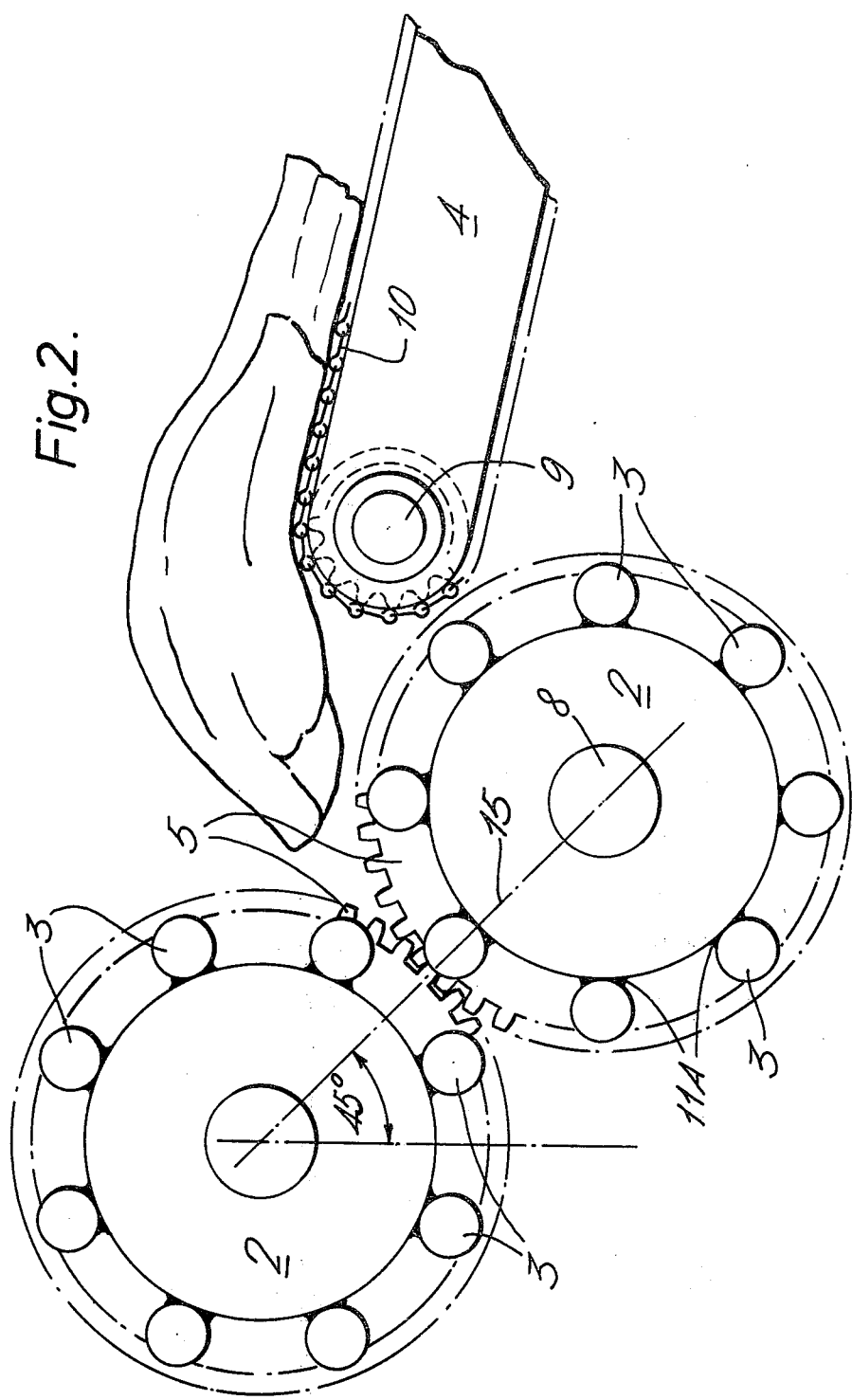

MEAT TENDERIZING APPARATUS

BACKGROUND OF THE INVENTION

This invention relates to meat tenderising apparatus intended for tenderising raw meat such as ham or steaks.

One of the most common reasons for toughness, or lack of tenderness, in meat such as steak or ham is the firmness and adhesion of the tissue fibres in the raw meat. This fibre adhesion can vary substantially between one cut or joint and another, and it is well known in the cooking art that the tenderness of a steak or joint can be improved by breaking down this fibre adhesion (e.g. by hammering) immediately prior to cooking.

Attempts have been made to tenderise meat on a large scale immediately after slaughter and butchery, but these have been generally unsuccessful as the apparatus used has also produced bruising of the meat. This is undesirable where, as frequently occurs, the meat is stored for some time before it is cooked.

It is an object of the present invention to provide a meat tenderising apparatus which is capable of tenderising meat at a high without producing bruising of the meat.

Ham and pork meat is frequently injected with brine to improve its flavour and keeping qualities. In addition to tenderising the meat, the apparatus of the invention also treats the meat in such a manner that it is capable of taking in more brine during a brine injection treatment, resulting in improved flavour.

SUMMARY

According to the present invention, a meat tenderising apparatus comprises a frame, a pair of rollers mounted in the frame with their rotational axes disposed in substantially parallel planes, a plurality of generally axially-directed ribs disposed on the outer surface of each of said rollers, drive means operable to rotate the rollers in opposite directions, and conveyor means terminating adjacent the nip between the rollers for feeding meat into said nip, the rollers being positioned in the frame and the drive means being arranged such that at said nip, the ribs of one roller are aligned with the gaps between the ribs of the other roller.

In order to provide the best conditions for compressing and compacting the meat fibres without bruising the meat, suitably each roller is cylindrical and said ribs comprise identical equi-spaced bars of circular section fixed to the outer surface of the roller and extending axially relative thereto. The diameter of these bars should be less than the width of the gaps between adjacent bars, and the rollers should be located in the frame such that the pitch circles described by the radially outermost parts of the bars are coincident or substantially coincident.

As an alternative to the axial ribs, the ribs may extend spirally round the rollers.

The axes of the rolls are preferably generally horizontal and one may be higher than another so that a line joining the roller centres subtends an angle of about 40°-50° to the vertical.

The conveyor is preferably of the moving belt type and may be an endless belt, the delivery end terminating above the or adjacent the roller nip. Desirably, the conveyor delivers the pieces of meat close to the entry to the nip so that the meat does not bunch or curl prior to entering the nip.

Preferably the peripheral speed of the rollers is between 15 and 25 ft/min. The preferred speed is between 16 and 18 ft/min.

BRIEF DESCRIPTION OF THE DRAWINGS

FIG. 2 is an end elevation of the rollers and the delivery end of the conveyor of the apparatus shown in FIG. 1.

DESCRIPTION OF THE PREFERRED EMBODIMENTS

Figure 1:
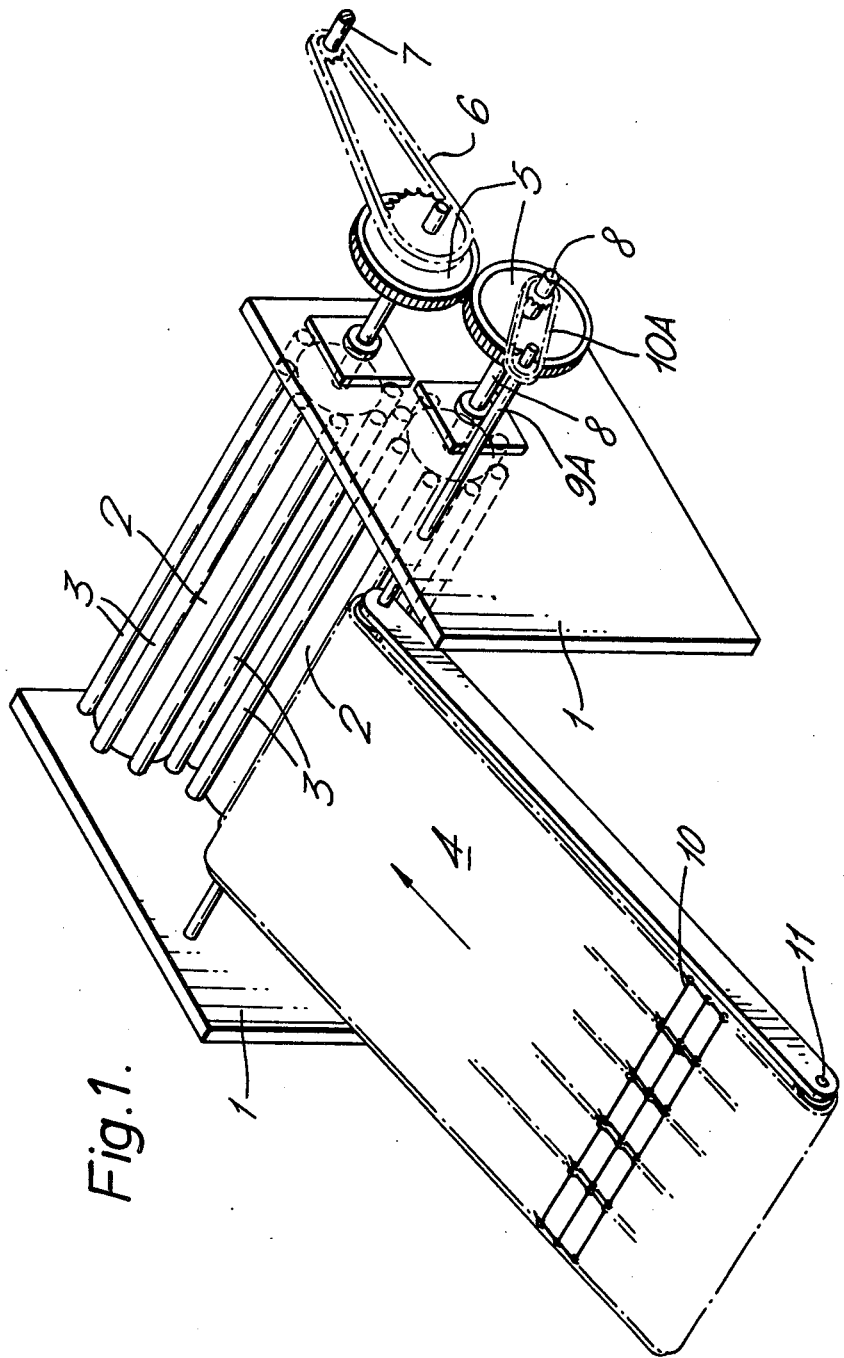
FIG. 1 is a perspective view showing one embodiment of meat tenderising apparatus according to the invention.

Referring to the drawings, the meat tenderising apparatus comprises a frame 1 in which are journalled in suitable bearings, a pair of rollers 2 having their axes aligned in parallel horizontal planes. Equally spaced about the outer surface of the rollers are a series of axially-extending ribs 3 which, as will be seen from FIG. 2, comprise rods of circular section fixed to the outer surface of the rollers by weld seams 11A. Both the rollers and the ribs are formed from stainless steel.

The rollers 2 are driven in opposite directions through intermeshing gears 5 coupled by a suitable drive, shown as a chain 6 to the output shaft 7 of drive means (not shown) such as an electric motor which is preferably mounted on the frame 1.

An endless conveyor 4 is provided for delivering pieces of meat into the roller nip. This conveyor comprises an endless conveying belt 10 formed from a flexible open mesh material which passes over an idler roller 11 at its lower end and a driven roller 9 at its upper end; the driven roller has an axle 9A journalled in the frame 1 and this is driven via a chain 10A passing over a sprocket fixed to the shaft 8 of the lowermost of the rollers 2. This arrangement ensures that the rollers and conveyor are driven in timed relation. If desired, the conveyor may be run at a slightly slower speed than the rollers.

The conveyor is of open mesh form to ensure that air circulates around the meat; alternatives would be belts having slatted or perforated constructions.

As will be seen from FIG. 2, the rollers are arranged in the frame at different vertical positions with a line 15 joining the roller centres subtending an angle of between 40° and 50° (in this case 45°), to the vertical. As will be seen from FIG. 2, this aids the introduction of meat into the roller nip and prevents curling or bunching of the meat as it enters the nip. The conveyor run terminates close to the nip in order to assist meat feed.

Alternative arrangements are of course possible. For example, the roller axes may be located side by side in the same horizontal plane, with the conveyor run terminating above the roller nip; with this construction the meat drops into the roller nip when it reaches the end of the conveyor.

In order to provide the most suitable action for tenderising the meat, the position, peripheral speed and construction of the rollers must be carefully chosen. As will be seen from FIG. 2, each roller is provided with eight equally-spaced and identical circular-section ribs 3. The spacing between the ribs is substantially greater than the rib diameter.

The rollers are mounted so that, as they rotate in opposite directions and at constant speeds, the ribs of one roller are aligned with the gaps between the ribs of the other roller at the roller nip. It is preferable that the ribs do not actually intermesh at the nip as this can lead to excessive crushing of the meat tissue. Instead, the pitch circles of the radially outermost points of the ribs of each roller substantially coincide at the roller nip. This construction ensures that the meat fibres are compressed and impacted by several successive ribs without the meat becoming bruised. This manipulation or massaging breaks down the fibres of the meat tissue and leads to a substantially more tender final product.

The rotational speed of the rollers is important in achieving the desired result, and the peripheral speed of the rollers should lie between 15 and 25 ft/min. The preferred peripheral speed is 17 ft/min, which is equivalent to a 6.5 in. diameter roller rotating at 10 r.p.m. In this particular example, the ribs had a diameter 1 5/16 in. and the rollers an overall length of 35 in.

The apparatus has proved particularly effective as a pre-treatment for meat undergoing brine injection. The manipulation of the meat between the rollers causes the meat to expand and gives it the ability to absorb larger quantities of brine at the brine injection stage. This results in improved flavour in the final product, in addition to the improvement in texture.

I claim:

1. A meat tenderising apparatus comprising a frame, a pair of rollers mounted in the frame with their rotational axes disposed in substantially parallel planes, a plurality of generally axially-directed ribs having rounded outer contours disposed on the outer surface of each of said rollers, drive means operable to rotate the rollers in opposite directions, and conveyor means terminating adjacent the nip between the rollers for feeding meat into said nip, the rollers being positioned in the frame and the drive means being arranged such that at said nip, the ribs of one roller are aligned with the gaps between the ribs of the other rollers substantially without intermeshing occurring between the ribs and gaps so that tenderising of the meat is effected without crushing as it passes between the rollers.

2. A meat tenderising apparatus as claimed in claim 1, wherein each roller is cylindrical and said ribs comprise identical equi-spaced bars of circular section fixed to the outer surface of the roller and extending axially relative thereto.

3. A meat tenderising apparatus as claimed in claim 2, wherein the diameter of said bars is less than the width of the gaps between adjacent bars.

4. A meat tenderising apparatus as claimed in claim 1, wherein each roller is cylindrical and said ribs comprise identical equi-spaced bars of circular section fixed to the outer surface of the roller and extending axially relative thereto, and the rollers are located in the frame such that the pitch circles of the rollers described by the radially outermost parts of the bars are coincident.

5. A meat tenderising apparatus as claimed in claim 1, wherein the rollers are mounted with their rotational axes disposed in a horizontal plane.

6. A meat tenderising apparatus as claimed in claim 5, wherein one of the rollers is mounted in the frame at a higher vertical position than the other, and a line joining the roller centres subtends an angle of between 40° and 50° to the vertical.

7. A meat tenderising apparatus as claimed in claim 1, wherein the drive means is adapted to drive said rollers at a peripheral speed of between 15 and 25 ft/min.

8. A meat tenderising apparatus as claimed in claim 1, wherein the rollers are mounted on axles journalled in the frame, and said axles are provided with intermeshing pinions driven through a drive chain and sprocket arrangement, and wherein said conveyor means comprises a belt conveyor having an axle driven through a drive chain and sprocket arrangement, and said drive means is adapted to drive both said drive chains whereby the belt conveyor and the rollers operate in timed relation.

9. A meat tenderising apparatus as claimed in claim 8, wherein the conveying surface of the belt conveyor is formed from a flexible, open-mesh material.

* * * * *